United States Patent
Peng et al.

(10) Patent No.: US 12,033,007 B2
(45) Date of Patent: Jul. 9, 2024

(54) ENFORCING APPLICATION PROGRAMMING INTERFACE LIMITS IN A DOCUMENT MANAGEMENT SYSTEM

(71) Applicant: DocuSign, Inc., San Francisco, CA (US)

(72) Inventors: Joey Jia Wei Peng, Seattle, WA (US); Abhishek Ram Battepati, Fremont, CA (US); Timofei Borisovich Bolshakov, Lynnwood, WA (US)

(73) Assignee: DOCUSIGN, INC., San Francisco, CA (US)

( * ) Notice: Subject to any disclaimer, the term of this patent is extended or adjusted under 35 U.S.C. 154(b) by 281 days.

(21) Appl. No.: 17/728,763

(22) Filed: Apr. 25, 2022

(65) Prior Publication Data

US 2023/0342224 A1    Oct. 26, 2023

(51) Int. Cl.
| | |
|---|---|
| G06F 3/00 | (2006.01) |
| G06F 8/36 | (2018.01) |
| G06F 9/50 | (2006.01) |
| G06F 9/54 | (2006.01) |
| G06F 16/93 | (2019.01) |

(Continued)

(52) U.S. Cl.
CPC .............. *G06F 9/54* (2013.01); *G06F 8/36* (2013.01); *G06F 9/5005* (2013.01); *G06F 16/93* (2019.01); *G06F 18/214* (2023.01); *G06F 21/1064* (2023.08)

(58) Field of Classification Search
None
See application file for complete search history.

(56) References Cited

U.S. PATENT DOCUMENTS

| | | | | |
|---|---|---|---|---|
| 8,681,630 B1 * | 3/2014 | Gibson | .................. | H04L 67/62 |
| | | | | 370/235 |
| 9,813,509 B1 * | 11/2017 | Visser | ..................... | G06F 9/547 |
| 9,900,264 B1 * | 2/2018 | Chen | .................. | G06Q 30/0283 |

(Continued)

FOREIGN PATENT DOCUMENTS

| | | | | |
|---|---|---|---|---|
| CN | 104580095 A * | 4/2015 | | |
| EP | 3336700 A1 * | 6/2018 | ........... | G06F 9/5044 |

(Continued)

OTHER PUBLICATIONS

Andrew D. Ferguson, Participatory Networking: An API for Application Control of SDNs. (Year: 2013).*

*Primary Examiner* — Lechi Truong
(74) *Attorney, Agent, or Firm* — Shumaker & Sieffert, P.A.

(57) ABSTRACT

A document management system processes application programming interface (API) requests received from entities. The document management system processes the API requests to perform operations such as modifying a document, executing a document, or sending a set of documents to another entity. The document management system enforces API limits on API requests received from entities and processed by the document management system. The document management system allows an entity to request a modification to an API limit to a target API limit and determines whether to approve the requested modification. The document management system determines whether to approve the requested API limits based on a comparison with other entities that are similar to the entity based on past API requests received from the other entities.

12 Claims, 6 Drawing Sheets

(51) Int. Cl.
*G06F 18/214* (2023.01)
*G06F 21/10* (2013.01)

(56) References Cited

U.S. PATENT DOCUMENTS

| | | | |
|---|---|---|---|
| 10,445,151 B1* | 10/2019 | Ko | G06F 11/3466 |
| 11,032,160 B1* | 6/2021 | Raheja | H04L 41/0843 |
| 11,138,033 B1* | 10/2021 | Sem | G06F 9/54 |
| 2018/0167288 A1* | 6/2018 | Mogaki | G06F 9/5077 |
| 2018/0270299 A1* | 9/2018 | McCourtney | G06F 9/451 |
| 2018/0307476 A1* | 10/2018 | Kitajima | G06F 9/54 |
| 2021/0006496 A1* | 1/2021 | Xiong | G06F 9/547 |
| 2021/0133761 A1* | 5/2021 | Cartwright | G06Q 20/127 |
| 2022/0006786 A1* | 1/2022 | Ogrinz | H04L 63/0263 |
| 2023/0088768 A1* | 3/2023 | Bispo | G06F 9/541 |
| | | | 726/29 |

FOREIGN PATENT DOCUMENTS

| | | | | |
|---|---|---|---|---|
| EP | 3761560 A1 * | 1/2021 | | G06F 9/547 |
| EP | 3817337 A1 * | 5/2021 | | G06F 16/27 |
| JP | 2021111367 A * | 8/2021 | | G06F 11/3684 |

* cited by examiner

ENFORCING APPLICATION PROGRAMMING INTERFACE LIMITS IN A DOCUMENT MANAGEMENT SYSTEM

FIELD OF INVENTION

The disclosure generally relates to document management systems, and more specifically to enforcing limits in processing of application programming interfaces (APIs) supported by a document management system.

BACKGROUND

Systems offering services typically support APIs that allow external systems, for example, client applications to invoke features offered by the services. For example, a document management system may support services that allow operations related to processing of documents such as sharing documents, signing documents, editing of documents, and so on. The document management system may support APIs that can be invoked by external systems such as applications. Invoking APIs at a very high rate or using extreme parameter values may cause performance degradation or even failure of the system executing the APIs. Furthermore, such invocations may affect other external systems, for example, an API for sharing of documents with a target system may affect the performance of the target system. An external system may perform such extreme API invocations due to programing defects or possibly due to malicious behavior. Systems such as document management system may enforce a limit on execution of APIs, for example, a limit on the number of times an API is invoked in a time interval. However, different external systems may have different usage requirements for the document management system. This makes it challenging for a system to determine the limits on API invocations. For example, larger external systems may require much higher rate of invocation of the APIs compared to smaller external systems. Furthermore, requirements of an external system may change over time. Therefore, it is challenging for a system to determine and enforce API limits.

SUMMARY

A document management system described herein processes application programming interface (API) requests received from entities. Examples of API requests include request to modify a document, request to execute a document, request to send a set of documents to another entity, and so on. The document management system enforces API limits on API requests received from entities. The requirements of an entity may change over time, thereby requiring modifications to the API limits. The document management system allows an entity to request a modification to an API limit to a target API limit. The document management system automatically determines whether to approve or deny the requested modification. The document management system identifies other entities that are similar to the entity based on past API requests received from the entity as well as other entities. The document management system determines an expected API limit for the entity based on the API limits used by other similar entities. The document management system compares the requested target API limit with the expected API limit and determines whether to approve the requested modification to the target API limit based on the comparison.

According to an embodiment, the document management system enforces the API limit to determine whether to execute the received API request as follows. The document management system determines a value of an attribute describing the API request and determines whether the value of the attribute is within an API limit. The document management system executes an operation corresponding to the API request responsive to the value of the attribute being within the API limit.

The attribute may represent a number of API requests processed for the entity in a time interval of a particular size, wherein the API limit specifies a maximum number of API requests processed for the entity in a time interval of the particular size. The attribute may represent a number of envelopes sent by the entity in a time interval of a particular size, wherein the API limit specifies a maximum number of envelopes allowed to be sent by the entity in any time interval of the particular size. The attribute may represent a number of documents allowed in an envelope sent by the entity in an API request of a particular type, wherein the API limit specifies a maximum number of documents allowed to be sent by the entity in any API request of the particular type.

Embodiments include non-transitory computer-readable storage medium storing executable instructions that, when executed by a hardware processor, cause the processor to perform steps of the methods disclosed herein. Embodiments include computer systems that include one or more processors and a non-transitory computer-readable storage medium storing executable instructions that, when executed by a hardware processor, cause the processor to perform steps of the methods disclosed herein.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG.

Figure 1:
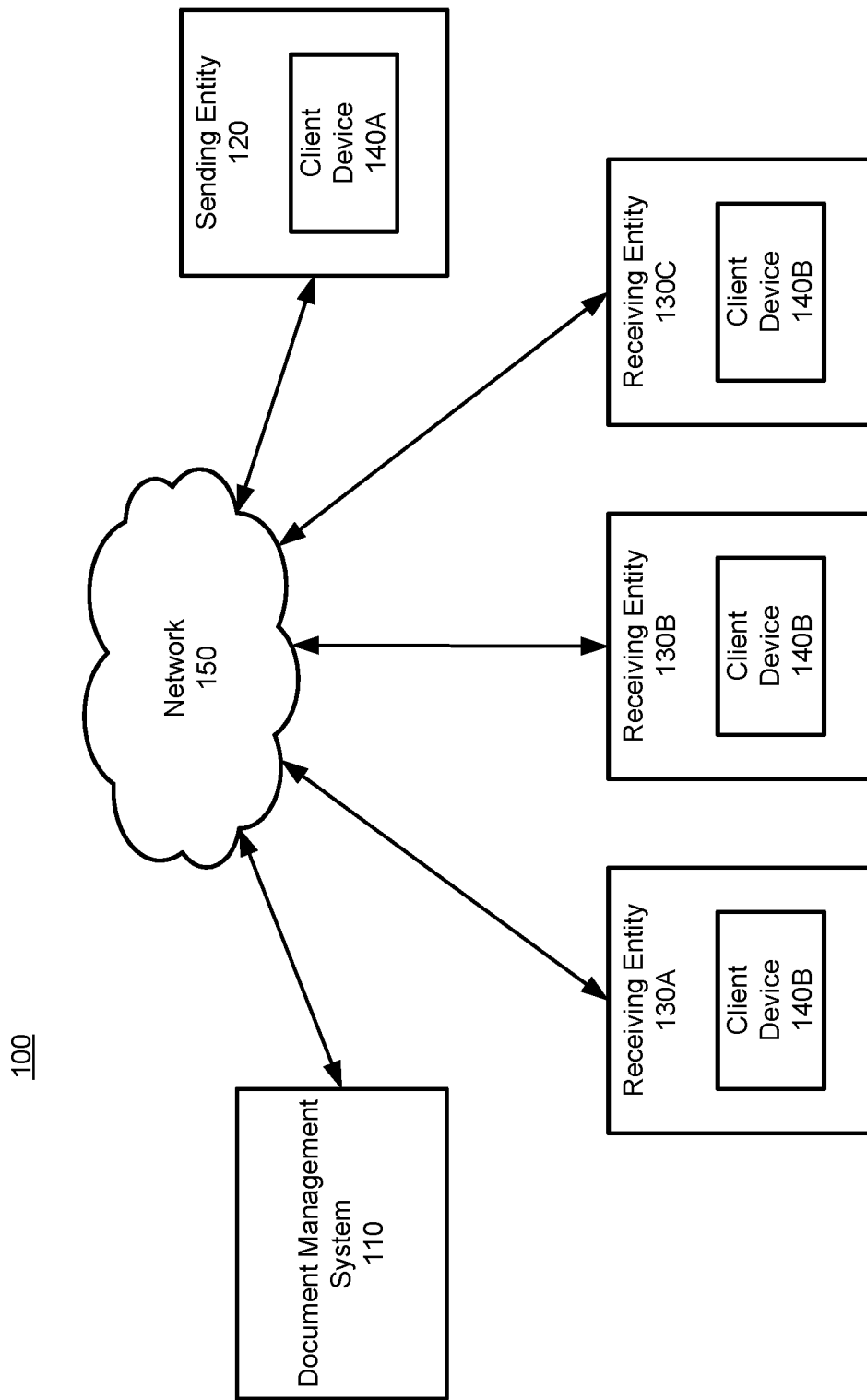
(FIG. 1 is a block diagram of a system environment in which a document management system operates, in accordance with an embodiment.

The figures depict various example embodiments of the present technology for purposes of illustration only. One skilled in the art will readily recognize from the following description that other alternative embodiments of the structures and methods illustrated herein may be employed without departing from principles of the technology described herein.

DETAILED DESCRIPTION

A document management system receives and processes API requests, for example, requests to share documents, requests to send envelopes representing sets of documents, requests for executing documents and so on. The document management system enforces specific limits of APIs, for example, an API limit on the number of times the API is invoked within a time interval, API limits on values of arguments that can be passed, API limits on the sizes of data structures processed by the APIs, and so on. Exceeding the API limits either accidentally or deliberately by an application may result in unexpected consequences in the system, for example, in terms degradation of performance or even system failure. An application may exceed the API limits due to defects in the application code or due to malicious programming. An API invocation may affect not only the system supporting the APIs but other systems that may be impacted by an API. For example, an API that allows an application to share a document with a target system may be invoked at an exceedingly high rate to cause a failure of the target system.

Various external systems may have different usage requirements for the document management system. For example, larger external systems may require much higher rate of invocation of the APIs compared to smaller external systems. An external system may request adjustment of specific API limits depending on their requirements. For example, the requirements of an entity may change over time, requiring the entity to request an increase of the API limits. The document management system may perform review of the requested API limits before approving the requests. If the process of reviewing these requests is slow, the external system sending the request to modify the API limits has to wait for the request to be approved and for the new limits to be enforced. Until the new limits are enforced, the external system is unable to fully utilize the services of the document management system. Embodiments of the system allow the document management system to automatically review requests for modification of API limits and approve them.

Although the techniques disclosed herein are described in the context of a document management system, the techniques can be applied for reviewing and approving adjustments to API limits for other systems that process requests, for example, search engines, database systems, and so on.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment Overview

A system environment enables a sending entity to create and send documents to a one or more receiving entities for negotiation, collaborative editing, electronic execution (e.g., electronic signature), automation of contract fulfilment, archival, and analysis, among other tasks. Within the system environment, a receiving entity may review content and/or terms presented in a document, and in response to agreeing to the content and/or terms, can electronically execute the document. In some embodiments, the sending entity generates a distinct copy (also referred to as an envelope) of a set of documents to provide to each of the plurality of receiving entities in a bulk sending process. The bulk sending process allows the sending entity to generate and send a batch of copies to a plurality of receiving entities where each receiving entity receives a distinct copy of the set of documents. For example, the sending entity may generate a batch to include a thousand distinct copies to provide to a thousand distinct receiving entities.

Within the system environment, the sending entity may view information about the batch including a status of the batch, a status of each copy within the batch, any errors that took place prior or during the bulk send, which copies have been viewed by a corresponding receiving entity, which copies have been edited by a corresponding receiving entity, which copies have been executed by a corresponding recipient, etc. The sending entity can perform one or more actions both individually and in bulk on the copies within a batch. The actions may include making a correction to a copy or a subset of copies, re-sending a copy or a subset of copies, and/or voiding a copy or a subset of copies. It should also be noted that "receiving entity", "recipient", "acting entity", and other similar terminology are used interchangeably herein.

The document management system supports application programming interfaces (APIs) that allow a system to execute various operations supported by the document management system by involving the appropriate APIs. The document management system further enforces certain API limits that represent constraints on invocations of APIs by a system. For example, the document management system may impose a limit on the rate at which an API is invoked, such as a limit on the number of times the API is invoked within a particular time interval. The document management system may enforce a limit on specific parameters of the APIs, for example, if an API sends a document or an envelope to a plurality of receiving entity, the document management system imposes a limit on the number of receiving entities that can be specified by the API. The document management system may enforce other limits, for example, limits on the sizes of documents processed by an entity, the limits on sizes of envelopes or the number of documents allows in an envelope, and so on.

The system environment described herein can be implemented within a document management system, a centralized document system, an online document system, or any type of digital management platform. It should be noted that although description may be limited in certain contexts to a particular environment, this is for the purposes of simplicity only, and in practice the principles described herein can apply more broadly to the context of any digital management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

Figure (FIG. 1 is a block diagram of a system environment in which a document management system operates, in accordance with an embodiment. The system environment 100 illustrated in FIG. 1 includes a document management system 110, a sending entity 120 associated with a client device 140A, a plurality of receiving entities 130 (e.g., a receiving entity 130A, a receiving entity 130B, and a receiving entity 130C) each associated with a corresponding client device 140B, and a network 150. In alternative configurations, different and/or additional components may be included in the system environment 100.

The document management system 110 is a computer system (or group of computer systems) for storing and managing documents, copies (also referred to as envelopes), and/or batches of copies for a plurality of users (e.g., the sending entity 120 and the receiving entities 130). Using the document management system 110, the users can collaborate to create, edit, review, negotiate, and execute documents. A document may be a contract, agreement, purchase order, or any other document.

Prior to execution of the documents, the document management system 110 may generate a copy to include a set of documents for execution. The document management system 110 may generate the copy per a request from the sending entity 120. The set of documents included in the copy may include documents of various document types, for example contracts, purchase agreements, codes of conduct, lease agreements, bank forms, permission slips, term sheets, etc. Each document in the set of documents includes document content (e.g., words, images, etc.). In addition to the set of documents included in each copy, a distinct set of acting entities is included in a copy. The set of acting entities may be one or more individuals at a receiving entity 130 (e.g., at receiving entity 130A) that can perform one or more actions with respect to the set of documents. The one or more actions may include viewing, editing, declining, and/or executing the set of documents in the copy. In some embodiments, the documents (including the document content) may have been previously negotiated by two or more users (e.g., by the sending entity 120 and the receiving entity 130A).

The document management system 110 may generate a copy to include a set of documents for execution by a plurality of receiving entities 130 (e.g., per a request from the sending entity 120). The document management system 110 generates a batch of copies of the set of documents in a bulk sending process. The document management system 110 sends the batch by providing a distinct copy of the set of documents to the receiving entity 130A, the receiving entity 130B, and the receiving entity 130C. In some embodiments, the set of documents of any or all copies within a batch may contain some customized document content.

The document management system 110 can generate a batch of copies of a set of documents in a bulk sending process that are provided to hundreds or thousands of receiving entities 130. In order to manage any bulk sending process, the document management system 110 generates an interface (e.g., to be displayed via the client devices 140) that displays information about a batch and about each copy within the batch. For example, the interface may display information about the recipient of a copy and a status of the copy. In some embodiments, the document management system 110 updates the status of the copy based on one or more actions performed by a corresponding recipient. Information about the batch displayed in the interface may additionally include a status of the batch and/or any errors that took place prior or during the bulk send. The interface provides a means for the sending entity 120 to perform an action on a batch, on a subset of copies within a batch, or on a copy within a batch. The action performed may include making a correction, re-sending, and/or voiding the batch, the subset of copies, or a copy.

The document management system 110 can be a server, server group or cluster (including remote servers), or another suitable computing device or system of devices. In some implementations, the document management system 110 can communicate with client devices 140 over the network 150 to receive instructions and send copies (or other information) for viewing on client devices 140. The document management system 110 will be discussed in further detail with respect to FIG. 2.

The sending entity 120 prepares and sends copies of a set of documents to the plurality of receiving entities 130 via the document management system 110. For example, the sending entity 120 instructs the document management system 110 to prepare and send a batch of copies to the plurality of receiving entities 130 in a bulk sending process. The sending entity 120 may be an individual, an organization, a company, a group, an account, etc. The sending entity 120 can be associated with a user account, username, email address, or other identifier that can be used by the document management system 110 to identify the sending entity 120 and to control the ability of the sending entity 120 to view, modify, and otherwise interact with the copy managed by the document management system 110. In some implementations, the sending entity 120 can interact with the document management system 110 through their user account with the document management system 110 and one or more client devices 140 accessible to that sending entity 120. The sending entity 120 may be an administrator of the copies (or batch), which may be an individual who created the copies (or created one or more documents of the set of documents included in the copies) and/or who has authority to view, edit, and/or send the copies (or batch).

In an example implementation, the sending entity 120 may be a human resource representative for an organization. The representative requests the document management system 110 prepare and send a batch of copies of a set of documents related to updates to the organization's code of conduct to a plurality of receiving entities 130 (e.g., all employees within the organization). Each receiving entity 130 (each employee) will receive a distinct copy of the set of documents. In this example implementation, the set of documents in each copy of the batch may be customized for each receiving entity 130, for example the employee's name, hire date, and employee identification number is included within the document contents.

The receiving entities 130 (also referred to as recipients) receive copies of the set of documents. Each receiving entity 130 can receive a distinct copy of the set of documents. A receiving entity 130 may be an individual, an organization, a company, a group, an account, etc. In some embodiments, a receiving entity 130 can be associated with a user account, username, email address, or other identifier that is used by the document management system 110 to identify the receiving entity 130 and to control the ability of the receiving entity 130 to view, modify, and otherwise interact with the copy and set of documents managed by the document management system 110. For example, a receiving entity 130 can interact with the document management system 110 through a user account with the document management system 110 and one or more client devices 140 accessible to that receiving entity 130. In some embodiments, the sending entity 120 and a receiving entity 130 may be associated with a same organization and/or a same company. The receiving entities 130 can perform one or more actions associated with a received copy of the set of documents. For example, a receiving entity 130 can view the copy, can edit the copy, decline the copy, and/or can execute the copy. A receiving entity 130 may perform any of the one or more actions via the document management system 110.

Each client device 140 is a computing device capable of receiving user input (for example from the sending entity 120) as well as transmitting and/or receiving data to the document management system 110 via the network 150. For example, a client device 140 can be a desktop or a laptop computer, a smartphone, tablet, or another suitable device. Client devices 140 are configured to communicate via the network 150 (for example, with the document management system 110). In one embodiment, a client device 140 executes an application allowing a user of the client device 140 to interact with the document management system 110. For example, a client device 140 can execute a browser application to enable interaction between the client device 140 and the document management system 110 via the network 150. In some embodiments, a single user can be associated with multiple client devices 140, and/or one client device 140 can be shared between multiple users who may, for example, log into a personal account on the client device 140 to access the document management system 110.

The network 150 transmits data within the system environment 100. The network 150 may comprise any combination of local area and/or wide area networks, using both wired and/or wireless communication systems, such as the Internet. In some embodiments, the network 150 transmits data over a single connection (e.g., a data component of a cellular signal, or Wi-Fi, among others), and/or over multiple connections. In some embodiments, the network 150 uses standard communications technologies and/or protocols. For example, the network 150 includes communication links using technologies such as Ethernet, 802.11, 3G, 4G, code division multiple access (CDMA), digital subscriber line (DSL), and the like. Data exchanged over the network 150 may be represented using any suitable format, such as hypertext markup language (HTML) or extensible markup language (XML). In some embodiments, the network 150 may include encryption capabilities to ensure the security of customer data. For example, encryption technologies may include secure sockets layers (SSL), transport layer security (TLS), virtual private networks (VPNs), and Internet Protocol security (IPsec), among others.

In some embodiments, the document management system 110 tracks a group of entities that make API calls. For example, a group of entities may correspond to an organization or an enterprise that represents a customer of the document management system 110. Accordingly, the document management system 110 monitors the usage of the resources of the document management system 110 by the entire group of the entities. For example, the document management system 110 may have some arrangement, for example, a licensing arrangement that corresponds to a particular measure of resource utilization. The document management system 110 determines whether the entity group is efficiently utilizing the resources of the document management system 110. The document management system 110 determines a measure of expected resource utilization for the entity group. The document management system 110 determines the actual resource utilization by the entity group. The document management system 110 determines a measure of efficiency based on the actual resource utilization compared to the expected resource utilization. For example, the document management system 110 may determine the efficiency as a ratio of the expected resource utilization and the actual resource utilization.

Figure 2:
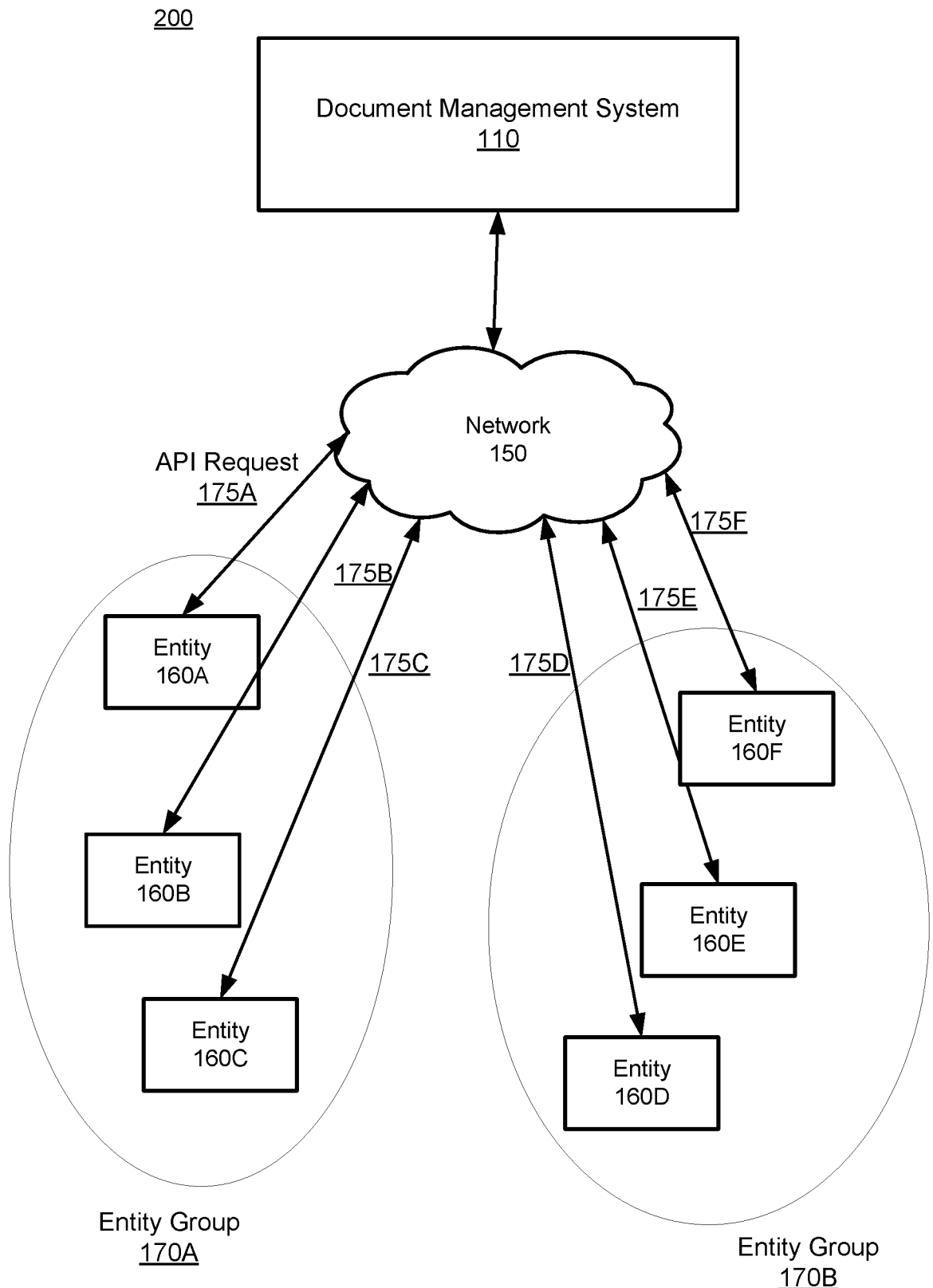
FIG. 2 illustrates monitoring of API requests made by groups of entities, according to an embodiment.

FIG. 2 illustrates monitoring of API requests made by groups of entities, according to an embodiment. FIG. 2 shows a system environment 200 in which entities 160 grouped into entity groups 170 may sent API requests to the document management system 110. For example, entities 160A, 160B, 160C belong to entity group 170A and entities 160D, 160E, 160F belong to entity group 170B. An entity group may be associated with an organization or a department within an organization or may be any other logical group of entities that are associated with each other. An entity 160 may be a sending entity or a receiving entity. The document management system 110 monitors API requests 175A, 175B, 175C, 175D, 175E, 175F, received from the entities of the entity group. For example, the document management system 110 may aggregate API requests received from all the entities of the entity group over a time interval to determine an aggregate rate of API requests. Accordingly, the document management system 110 enforces the API limits across a plurality of entities of the entity group 170. For example, if the aggregate number of API requests received within exceeds a threshold value represented by an API limit, the document management system 110 may deny subsequent API requests made by any of the entities of the entity group 170. Similarly, if an aggregate number of envelopes sent by entities of an entity group exceeds a threshold value represented by an API limit, the document management system 110 may deny subsequent API requests made by any of the entities of the entity group 170. The techniques disclosed herein that are applied to entities are also applicable to entity groups.

Document Management System Architecture

Figure 3:
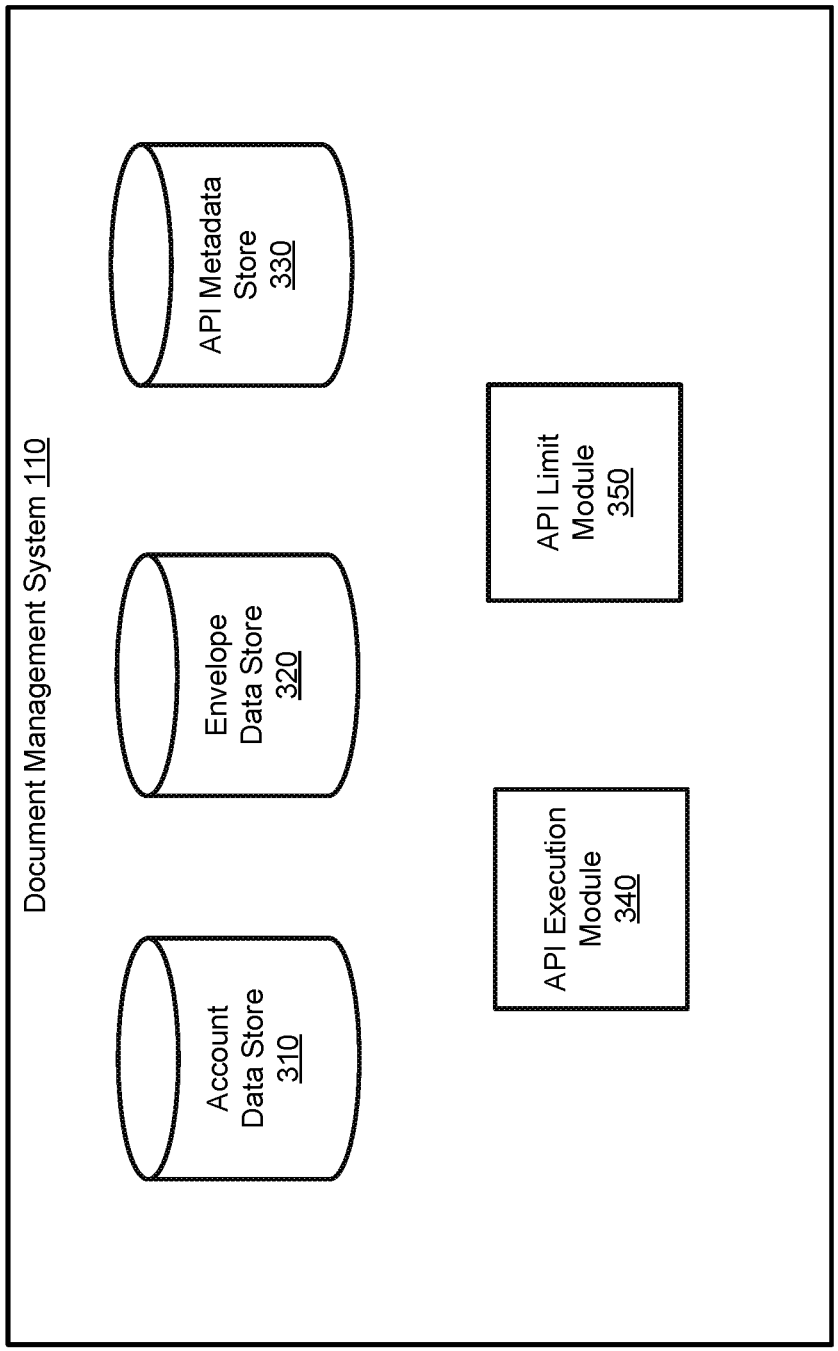
FIG. 3 is a block diagram of a document management system, in accordance with an embodiment.

FIG. 3 is a block diagram of a document management system, in accordance with an embodiment. Components of the document management system 110 may be a combination of hardware and software. The document management system 110 may include an account data store 310, an envelope data store 320, an API metadata store 330, an API execution module 340, and an API limit model 350. In various embodiments, the document management system 110 may include fewer or additional components that are not shown in FIG. 3. For example, conventional components such as network interfaces, security functions, load balancers, failover servers, management and network operations consoles, and the like are not shown so as to not obscure the details of the system architecture. The functions of the document management system 110 may be distributed among the components in a different manner than described.

The account data store 310 is a file storage system, database, set of databases, or other data storage system storing information associated with accounts of the document management system 110. Entities (e.g., the sending entity 120) may be associated with one or more accounts with the document management system 110. In some embodiments, the receiving entities 130 are associated with accounts with the document management system 110. Each account associated with an entity may include information about the entity, such as information about individual(s) with access to the account, age of the account, frequency of account use, log of past account transactions, and the like. Information about the individual(s) with access to the account may include the individual's name, email address, address, title, role, department, and the like.

The envelope data store 320 is a file storage system, database, set of databases, or other data storage system storing information associated with envelopes (also referred to as copies). An entity (e.g., the sending entity 120) provides a set of documents to be included in an envelope. An envelope can include at least one document in the set of documents for execution. The at least one document may have been previously negotiated by the sending entity 120 and the one or more receiving entities 130. And, as such, the document(s) may be ready for execution upon the creation of an envelope. The envelope may also include a set of acting entities. The set of acting entities include who can view, edit, decline, and/or execute the document(s) included in the envelope. In some embodiments, the set of acting entities for an envelope is an individual. For example, a receiving entity 130A is an individual. In alternative embodiments, the set of acting entities for an envelope is a plurality of individuals. For example, a receiving entity 130B is a group of individuals. The set of acting entities may be designated via recipient information (e.g., contact information for the one or more acting entities). Contact information may include a name, email address, location information, or any other suitable contact information. In some embodiments, an envelope may include an access code. The access code is a unique set of numbers, letters, symbols, or any combination thereof that is provided to the set of acting entities so that the set of acting entities are able to perform one or more actions (e.g., view, edit, decline, execute) on the envelope. Without the access code or by entering an incorrect access code a predetermined number of times (e.g., three times), the set of acting entities cannot perform any action on the envelope of on the set of documents therein.

Information about an envelope stored in the envelope data store 320 may include document information specific to each document of the set of documents included in an envelope. For example, document information may include document type, document content, and document tags. Document type may provide identification information about the document, such as a document name, a document hash value or other numerical identifier, and/or a document category. The document category describes a topic of the document and may include purchase agreement, contract, employee agreement, bank form, permission slip, non-disclosure agreement, checklist, instruction set, code of conduct, term sheet, etc. The document content is all the words, images, logos, symbols, etc. included within the document. The document tags indicate which fields of the document need to be completed for execution (e.g., where an acting entity or acting entities should sign, date, or initial the document).

The envelope data store 320 stores information about a batch of envelopes. A batch of envelopes is a group of envelopes that include substantially similar sets of documents. Information associated with a batch stored in the envelope data store 320 may include a status of the batch, a status of each envelope within the batch, a time corresponding to the status of each envelope (e.g., a time the status is updated), and recipient information of each envelope.

The API execution module 340 receives requests for execution of APIs and executes the received requests. The APIs executed by the API execution module 340 may perform various operations such as creating and sending of documents to other entities, editing of documents, voiding a document, electronic execution (e.g., electronic signature), performing a bulk operation such as generating an envelope of a set of documents to provide to one or more receiving entities in a bulk sending process, and so on. An API may be invoked to generate a batch of envelopes for an entity for sending to a plurality of different recipients. A batch of envelopes may include tens, hundreds, thousands, or more envelopes to be sent to a corresponding tens, hundreds, thousands, or more recipients. The API execution module 340 determines whether a requested API satisfies certain API limits. If the requested API satisfies the API limits, the API execution module 340 proceeds to execute the requested API, or else the API execution module 340 denies the request to execute the API.

The API limit module 350 manages API limits for entities or groups of entities. The API limit module 350 stores the API limits for various APIs for different entities in the API metadata store 330. In an embodiment, the API limit module 350 allows an entity or an entity group to request a modification to an API limit. For example, the API limit module 350 may set a limit on the rate of execution of specific types of APIs by an entity. The entity may determine that the specified API limit is too restrictive and request an increase in the API limit value so that the entity can execute the API at a higher rate. As another example, the API limit module 350 may set a limit on the number of envelopes that an entity can process in a batch operation. The entity may request the limit to be increased so that the entity can sent more envelopes in a batch operation. As another example, the API limit module 350 may set a limit on the number of documents that the entity can send in an envelope. The entity may request an increase in the number of documents that the entity can send in an envelope. In an embodiment, the API limit module 350 configures a user interface and displays the user interface via a client device to the entity. The user interface is configured to receive a request to modify an API limit. The request to modify the API limit identifies a type of API for which the API limit is modified. The request to modify the API limit identifies the type of API limit, for example, the API limit for a rate of API invocations or an API limit for a parameter of an API. The API limit module 350 determines whether to approve or deny the request to modify the API limit received from an entity.

In an embodiment, the API limit module 350 trains a machine learning based model for predicting expected API limits for entities based on their past API requests. The API limit module trains the machine learning based model using training data set comprising historical API requests executed for a set of entities. The training dataset is labelled using values of API limits that were approved or used during past API invocations for various entities. The API limit module 350 extracts a set of features describing past API requests received from the entity. The API limit module 350 provides the set of features as input to a machine learning based model and executes the machine learning based model to predict the expected API limit for the entity.

In some embodiment, the API limit module 350 trains a machine learning based model for predicting a category of entity based on past API requests executed for an entity. The category of entity represents entities having a set of characteristics that are similar. Accordingly, all entities that belong to the category of entities have similar characteristics and have similar API limits. The document management system uses the category of an entity to identify similar entities so that the API limits used for these similar entities in the past can be used to determine the API limit for a given entity.

In some embodiment, the API limit module 350 trains a machine learning based model for predicting a context for API requests received from an entity. The context for the API requests (or invocations) represents the type of integration of the document management system with an external system from which the API requests were received, for example, an integration using an embedded application or a back-office integration. The document management system uses the context of an entity such that API limits used for similar entities using similar contexts in the past can be used to determine the API limit for a given entity.

In some embodiments, the API limit module implements one or more rule-based systems for determining values including expected API limits, category of entities, and context for API requests for an entity. The rule-based system includes rules that may be specified by experts. A rule may specify conditions based on specific values extracted based on past API invocations to determine the above values being predicted. For example, a rule may specify that if a value of an attribute A1>threshold T1 and value of an attribute A2>threshold T2 and so on, where A1, A2, etc. are attributes determined based on API requests received from an entity, then the category of the entity is C1. The rule may determine values of expressions, for example, weighted aggregate values to determine scores that are used for determining the above values that are predicted.

Process for Executing API Requests

Figure 4:
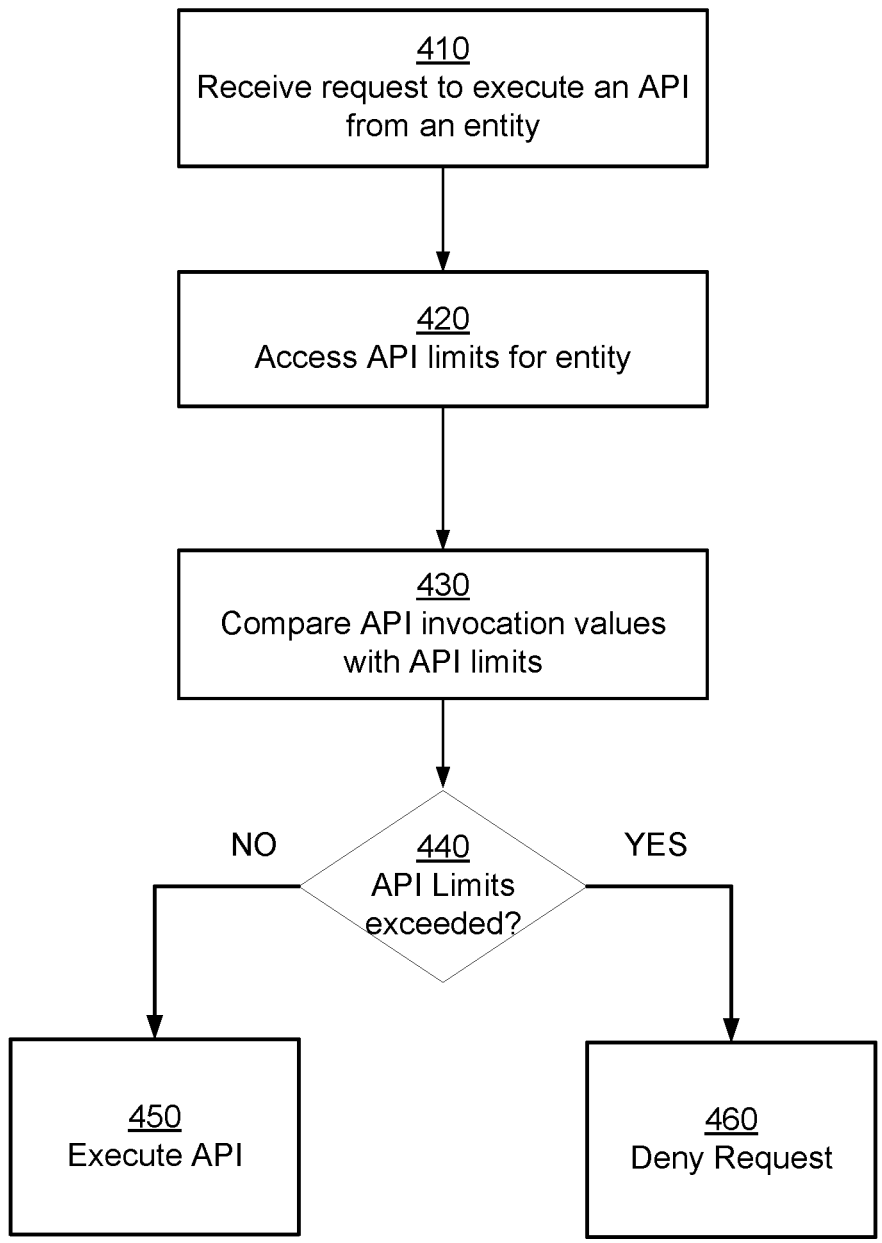
FIG. 4 is a flowchart illustrating a process of executing API requests, in accordance with an embodiment.

FIG. 4 is a flowchart illustrating a process of performing a bulk action on a subset of envelopes in a batch, in accordance with an embodiment. The process 400 shown in FIG. 4 is performed by a system, for example, the document management system 110 and may be performed by components of a document management system (e.g., the document management system 110), for example, the API execution module 340, the API, limit module 350, and others. Other entities may perform some or all of the steps in FIG. 4 in other embodiments. It should be noted that in other embodiments, the process 400 illustrated in FIG. 4 can include fewer, additional, or different steps that those described herein.

The document management system 110 receives, from an entity, a request 410 to execute an API. The document management system 110 accesses 420 API limits that may be relevant for execution of the API, for example, from the API metadata store 330. The API limits may be on the rate at which the APIs are received from the entity (for example, in a recent time interval) or the API limit may be on values of specific parameters of the API being requested. The document management system 110 evaluates various values related to the requested API, for example, the values of specific parameters of the API requested, the current rate at which the APIs are being executed by the entity as measured by the number of API invocations performed in a particular time interval, and so on. The document management system 110 determines 440 whether the API request satisfies all the relevant API limits or if the API request exceeds one or more API limits. If the document management system 110 determines 430 that the API request is within the relevant API limits, the document management system 110 executes 450 the requested API. If the document management system 110 determines 430 that the API request exceeds one or more relevant API limits, the document management system 110 denies 460 the request to execute the API.

Process for Determining API Limits

Figure 5:
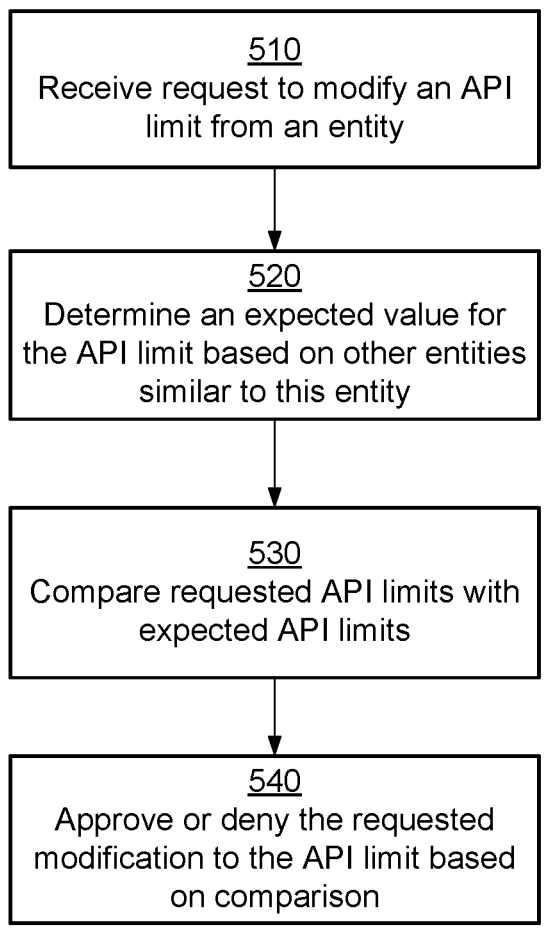
FIG. 5 is a flowchart illustrating a process of approving requests to modify API limits, in accordance with an embodiment.
Figure 6:
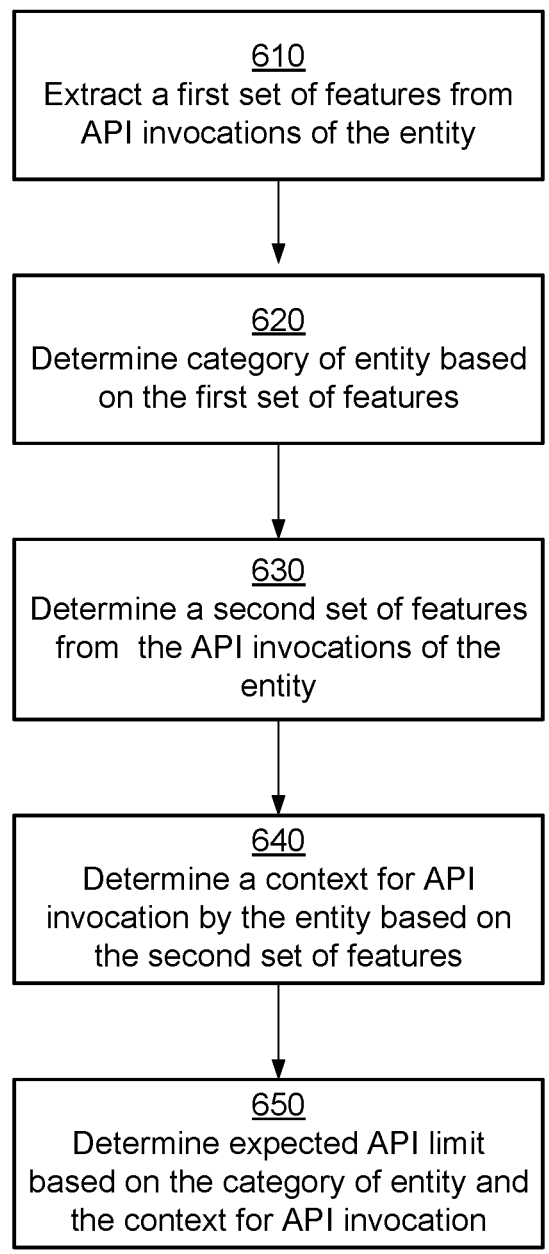
FIG. 6 is a flowchart illustrating a process of determining expected API limits for an entity, in accordance with an embodiment.

FIGS. 5-6 shows various processes performed by the document management system 110. The processes 500, 600 shown in FIGS. 5-6 may be performed by components of a document management system, for example, the API execution module 340, the API, limit module 350, and others. Other entities may perform some or all of the steps in FIG. 4 in other embodiments. It should be noted that in other embodiments, the processes 500, 600 can include fewer, additional, or different steps that those described herein.

FIG. 4 is a flowchart illustrating a process 400 of performing a bulk action on a subset of envelopes in a batch, in accordance with an embodiment.

The document management system 110 receives a request to modify an API limit from an entity. The API limit may be applicable to an entity or to a group of entities. The document management system 110 determines an expected value for the API limit. The document management system 110 determines the expected value for the API limit based on comparison with API limits used for other similar entities or similar entity groups. The document management system 110 compares the requested API limits with the expected API limits. The document management system 110 approves or denies the request to modify the API limit based on the comparison.

FIG. 5 is a flowchart illustrating a process 500 of approving requests to modify API limits, in accordance with an embodiment. The document management system 110 receives 510 from an entity, a request to modify an API limit. The request may identify a specific API limit and specify a target API limit such as an increased API limit that the entity requests to be applied to the account associated with the entity for subsequent API requests. Typically, the target API limit is higher than the current API limit applied to the account associated with the entity.

The document management system 110 determines whether to approve the increased API limit by performing the steps 520, 530, and 540. The document management system 110 determines 520 an expected value for the API limit for the entity. The document management system 110 determines the expected value of the API limit by identifying one or more other entities that are similar to the current entity.

The document management system 110 determines the API limits applied to the other entities that are similar to the current entity. The document management system 110 estimates an expected API limit for the current entity based on the API limits of the other similar entities. The document management system 110 compares the target API limit with the expected API limit. The document management system 110 approves or denies the requested modification to the API limit based on the comparison. For example, if the requested target API limit is more than a threshold amount greater than the expected API limit determined for the current entity, the document management system 110 may deny the request to modify the API limit or else the document management system 110 may approve the request to modify the API limit.

FIG. 6 is a flowchart illustrating a process 600 of determining expected API limits for an entity, in accordance with an embodiment. The document management system 110 extracts 610 a first set of features from API invocations based on API requests received from the entity in the past. The document management system 110 determines 620 a category of entity based on the first set of features.

According to an embodiment, the document management system 110 determines 630 a second set of features from the API invocations based on API requests received from the entity in the past. The document management system 110 determines 640 a context for the API invocations by the entity based on the second set of features. In an embodiment, the context for the API invocations represents the type of integration of the document management system with the external system (or entity) from which the API requests were received. Examples of the type of integrations with the external system include (1) an embedded application from which API requests are sent and (2) a system on which back-office integration in implemented from which the API requests are sent.

The document management system 110 determines 650 the expected API limit based on the category of entity and the context of API invocations by the entity. In an embodiment, the document management system 110 identifies the other entities that have the same category of entities as the other entities that are similar to the current entity. The document management system 110 further identifies other entities that are similar to the current entity and have a similar context for API invocations. The document management system 110 determines the expected API limit for the current entity based on API limits used for the other entities identified. For example, the document management system 110 may determine the expected API limit for the current entity as an aggregate value (e.g., average value) based on the API limits used for the other entities identified.

In some embodiments, different set of features are used for determining the category of the entity as compared to determining the context for the API invocations. In some embodiments, the same set of features is used for determining both the category of the entity as well as the context for the API invocations and the features are weighted differently for determining a weighted aggregate corresponding to each value. For example, a first set of weights are used for determining a weighted aggregate value for determining the category for the entity and a second set of weights are used for determining a weighted aggregate value for determining the context for the API invocations by the entity.

The features used for determining the category for the entity and the context for the API invocations include the following: (1) average number of envelopes per day (2) average number of API requests in a unit time interval, e.g., per day (3) maximum number of requests per envelope (4) percentage of API requests locked out by the document management system indicating that the entity is not processing errors correctly, and (5) a rate at which the entity sends API requests that exceed API limits. Another example, of a feature is values of attributes describing the profile of the entity based on specific attribute values passed to API requests, for example, an API request for registering the entity with the document management system. Attributes describing the entity may be included in headers of objects for example JSON (JavaScript object notation) objects passed as arguments to API requests.

In some embodiments, the document management system 110 determines a resource utilization efficiency score based on the set of features. The document management system 110 may determine the resource utilization efficiency score as a weighted aggregate of the features. The resource utilization efficiency score represents a measure of the amount of resources being utilized by the entity in a unit time interval. The document management system 110 aims to maintain a value of the resource utilization efficiency score for each entity withing a threshold value so that an entity does not attempt to utilize an extreme amount of resources.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computer systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    processing, by a document management system, application programming interface (API) requests sent by an entity, wherein the document management system enforces an API limit to determine whether to execute a received API request and wherein enforcing the API limit comprises:
        determining a value of an attribute describing the received API request, wherein the attribute represents a number of API requests processed for the entity in a time interval of a particular size;
        determining whether the value of the attribute is within the API limit, wherein the API limit specifies a maximum number of API requests processed for the entity in the time interval of the particular size; and
        executing an operation corresponding to the received API request responsive to the value of the attribute being within the API limit;

receiving, by the document management system and from the entity, a request to modify the API limit to a target API limit;
identifying one or more other entities that are similar to the entity based on past API requests received from the one or more other entities;
determining an expected API limit for the entity based on one or more API limits of the one or more other entities;
comparing the requested target API limit with the expected API limit for the entity; and
determining whether to approve the request to modify the API limit based on the comparison.

2. The method of claim 1, wherein identifying the one or more entities that are similar to the entity comprises:
extracting, by the document management system, a set of features describing past API requests received from the entity; and
comparing the set of features extracted from the entity with corresponding features extracted from each of the one or more other entities.

3. The method of claim 2, wherein the set of features comprises one or more features representing:
a rate at which API requests were received from the entity in a time interval;
a type of API identified in the request to modify API limit; and
one or more parameters passed with API requests received from the entity in the past.

4. The method of claim 1, further comprising:
extracting, by the document management system, a set of features describing past API requests received from the entity;
providing the set of features as input to a machine learning based model trained using a training data set comprising historical API requests executed for a set of entities; and
executing the machine learning based model to predict the expected API limit for the entity.

5. The method of claim 1, further comprising:
extracting, by the document management system, a set of features describing past API requests received from the entity; and
executing a rule-based system to determine the expected API limit from the set of features, the rule based system comprising rules determined based on API limits used for other entities in the past.

6. The method of claim 1, further comprising:
determining a type of system sending the received API request based on past API invocations, wherein the type of system is one of an embedded application or a system integration.

7. The method of claim 1, wherein the received API request is a request to perform an operation comprising one or more of:
modifying a document;
executing a document; or
sending an envelope comprising a set of documents to another entity.

8. Non-transitory computer-readable storage media storing executable instructions that, when executed, cause one or more hardware processors to:
process application programming interface (API) requests sent by an entity, wherein the instructions further cause the one or more hardware processors to enforce an API limit to determine whether to execute a received API request and wherein the instructions to enforce the API limit cause the one or more hardware processors to:
determine a value of an attribute describing the received API request, wherein the attribute represents a number of API requests processed for the entity in a time interval of a particular size;
determine whether the value of the attribute is within the API limit, wherein the API limit specifies a maximum number of API requests processed for the entity in the time interval of the particular size; and
execute an operation corresponding to the received API request responsive to the value of the attribute being within the API limit;
receive, from the entity, a request to modify the API limit to a target API limit;
identify one or more other entities that are similar to the entity based on past API requests received from the one or more other entities;
determine expected API limit for the entity based on one or more API limits of the one or more other entities;
compare the requested target API limit with the expected API limit for the entity; and
determine whether to approve the request to modify the API limit based on the comparison.

9. The non-transitory computer-readable storage media of claim 8, wherein the instructions further cause the one or more hardware processors to:
extract a set of features describing past API requests received from the entity;
provide the set of features as input to a machine learning based model trained using a training data set comprising historical API requests executed for a set of entities; and
execute the machine learning based model to predict the expected API limit for the entity.

10. The non-transitory computer-readable storage media of claim 8, wherein the instructions further cause the one or more hardware processors to:
determine a type of system sending the received API request based on past API invocations, wherein the type of system is one of an embedded application or a system integration.

11. A document management system comprising one or more hardware processors and non-transitory computer-readable storage media storing instructions that, when executed, cause the one or more hardware processors to:
process application programming interface (API) requests sent by an entity, wherein the instructions further cause the one or more hardware processors to enforce an API limit to determine whether to execute a received API request, wherein the instructions to enforce the API limit cause the one or more hardware processors to:
determine a value of an attribute describing the received API request, wherein the attribute represents a number of API requests processed for the entity in a time interval of a particular size;
determine whether the value of the attribute is within the API limit, wherein the API limit specifies a maximum number of API requests processed for the entity in the time interval of the particular size; and
execute an operation corresponding to the received API request responsive to the value of the attribute being within the API limit;
receive, from the entity, a request to modify the API limit to a target API limit;
identify one or more other entities that are similar to the entity based on past API requests received from the one or more other entities;

determine expected API limit for the entity based on one or more API limits of the one or more other entities;

compare the requested target API limit with the expected API limit for the entity; and determine whether to approve the request to modify the API limit based on the comparison.

12. The document management system of claim 11, wherein the instructions further cause the one or more hardware processors to:

extract a set of features describing past API requests received from the entity;

provide the set of features as input to a machine learning based model trained using a training data set comprising historical API requests executed for a set of entities; and execute the machine learning based model to predict the expected API limit for the entity.

\* \* \* \* \*